US006442405B1

(12) United States Patent
Hiramatsu et al.

(10) Patent No.: US 6,442,405 B1
(45) Date of Patent: Aug. 27, 2002

(54) BASE STATION DEVICE AND RADIO COMMUNICATION METHOD

(75) Inventors: Katsuhiko Hiramatsu, Yokosuka; Kazuyuki Miya, Kawasaki; Osamu Kato; Mitsuru Uesugi, both of Yokosuka; Akinori Tatsumi, Yokohama; Masatoshi Watanabe, Yokohama; Izumi Horikawa, Yokohama; Atsushi Iwaoka, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/555,379

(22) PCT Filed: Sep. 27, 1999

(86) PCT No.: PCT/JP99/05246
§ 371 (c)(1),
(2), (4) Date: May 30, 2000

(87) PCT Pub. No.: WO00/21221
PCT Pub. Date: Apr. 13, 2000

(30) Foreign Application Priority Data

Oct. 7, 1998 (JP) ............................................ 10-285642

(51) Int. Cl.[7] ................................................. H04B 1/38
(52) U.S. Cl. .................... 455/562; 455/277.1; 455/101; 455/25
(58) Field of Search ............................... 455/562, 277.1, 455/101, 11.1, 125, 67.3, 561, 448, 423, 132, 133; 370/252, 335, 441, 330, 345; 375/347; 342/457, 378

(56) References Cited

U.S. PATENT DOCUMENTS 5,408,679 A * 4/1995 Masuda ..................... 455/11.1
5,491,833 A * 2/1996 Hamabe ..................... 455/33.1
5,548,807 A * 8/1996 Ueda ......................... 455/33.1
5,596,333 A * 1/1997 Bruckert ..................... 342/457
5,719,583 A * 2/1998 Kanai ........................ 342/378
5,903,826 A * 5/1999 Nowak ..................... 455/277.1
6,064,338 A * 5/2000 Kobayakawa ............... 342/378
6,088,335 A * 7/2000 I .................................. 370/252
6,091,788 A * 7/2000 Keskitalo .................... 375/347
6,108,565 A * 8/2000 Scherzer .................... 455/562
6,151,310 A * 11/2000 Dent .......................... 370/330

FOREIGN PATENT DOCUMENTS

JP     10022912     1/1998
JP     10051380     2/1998

OTHER PUBLICATIONS

PCT International Search Report dated Dec. 28, 1999.
R. Yamaguchi et al., "Effect of Element Directivity on Adaptive Array Antenna of Base Station for Mobile Radio," Technical Report of IEICE, A–P96–131 (Jan. 1997) (in Japanese with abstract in English thereof).
T. Ohgane, "Spectral Efficiency Improvement by Base Station Antenna Pattern Control for Land Mobile Cellular Systems," IEICE Trans. Commun., vol. E77–B, No. 5, (May 1994) (in English).

(List continued on next page.)

Primary Examiner—Vivian Chin
Assistant Examiner—John J. Lee
(74) Attorney, Agent, or Firm—Stevens, Davis, Miller & Mosher, LLP

(57) ABSTRACT

Taking into account an optimal reception characteristic of a communication apparatus with variable directivity, the base station apparatus of the present invention has a communication apparatus with variable directivity positively accommodate a communication with a terminal in poor reception conditions, which makes it possible to reduce power of this terminal and reduce interference, thereby increasing the subscriber capacity in the system.

12 Claims, 16 Drawing Sheets

OTHER PUBLICATIONS

S. Tanaka et al., "Performance of Decision Directed Coherent Adaptive Diversity Array with SIR–Based Closed Loop TPC in DS–CDMA Reverse Link," Technical Report of IEICE, IT96–66, ISEC96–58, SST96–73 (Mar. 1997) (in Japanese with abstract in English thereof).

S. Seo et al., "Effects of SIR–based transmitpower control for coherent DS–CDMA mobile communications," Technical Report of IEICE, A–P96–155, EMCJ96–90, RCS96–169, MW96–195 (Feb. 1997) (in Japanese with abstract in English thereof).

* cited by examiner

BASE STATION DEVICE AND RADIO COMMUNICATION METHOD

TECHNICAL FIELD

The present invention relates to a base station apparatus and radio communication method in a digital radio communication system.

BACKGROUND ART

A conventional radio communication system is explained. FIG. 1 is a schematic view showing a conventional radio communication system using sector antennas. FIG. 2 is a schematic view showing a conventional radio communication system using variable directivities.

First, the conventional radio communication system using sector antennas is explained with reference to FIG. 1. For example, base station 1 carries out communications with three fixed directivities toward sector antenna (fixed directivity) A, sector antenna (fixed directivity) B and sector antenna (fixed directivity) C. Normally, setting such fixed directivities in different directions is called "sectorization." Base station 1 communicates with terminal A2 with fixed directivity A. Base station 1 further communicates with terminal B3 with fixed directivity B.

Thus, a radio communication system using many fixed directivities improves its reception characteristic using a diversity technology for increasing the number of antennas on the base station side. In a mobile communication environment in particular, the diversity technology compensates a drop of reception field intensity due to fading.

Next, a conventional radio communication system using variable directivities is explained with reference to FIG. 2. For example, base station 1 communicates with terminal A2 with variable directivity A. Base station 1 further communicates with terminal B3 with variable directivity B.

Thus, carrying out communications with a narrow directivity formed for every terminal makes it possible to improve frequency utilization. This technique is reported in TECHNICAL REPORT OF IEICE A·P96–131, etc. In addition, a system of performing control for every terminal so that a desired signal is received in optimal conditions and transmitting using a weighting factor generated at that time is described in ICIEC.Trans.COMMUN., VOL.E77-B, No.5 MAY, 1994.

Moreover, a method for performing control for every terminal so that a desired signal is received in optimal conditions, using the improved reception quality for a reduction of transmit power on the terminal side and increasing the subscriber capacity of the uplink is described in TECHNICAL REPORT OF IEICE IT96-66 (1997-03). The concept of transmit power control is reported in TECHNICAL REPORT OF IEICE A·96–155 (1997-02).

However, according to the conventional system, if the size of sectors is reduced, handover takes place more frequently between different sectors, which complicates communication control by a base station interrupting communications. Furthermore, in a CDMA communication system, identical signals spread by different spreading codes, are sent from a plurality of sectors to a same terminal to prevent the communication from being interrupted during handover. This function is called "diversity handover." However, signals directed to a same terminal are sent to a plurality of sectors during diversity handover, causing a shortage of the communication capacity on the downlink (communication channel from a base station to a terminal).

Moreover, in the technique disclosed in ICIEC.Trans.COMMUN., VOL.E77-B, No.5 MAY, 1994, reception signal correlation is about 1 because a signal is received by an array antenna. In a mobile communication environment, this will result in considerable deterioration in the characteristic when the intensity of a reception signal drops due to fading. Therefore, the communication quality needs to be compensated by diversity as in the case where sector antennas are used. However, since array antennas to form variable directivities are large and expensive, it is difficult to perform diversity with a plurality of array antennas.

Moreover, in the technique disclosed in TECHNICAL REPORT OF IEICE IT96-66 (1997-03), a drop of field intensity due to fading in a mobile communication environment is compensated by transmit power control on the terminal side. However, this needs high-speed transmit power control to follow up the mobile communication environment, requiring an expensive transmission amplifier for the terminal. Furthermore, since deterioration of the reception quality at the base station is compensated by the terminal, transmit power of the terminal increases, whereas the communication time and wait time are shortened.

Furthermore, since the conventional base station apparatus does not have a configuration that allows the number of terminals accommodated by the sector antennas or the number of terminals accommodated with variable directivities to be increased as required, the base station needs to be replaced.

DISCLOSURE OF INVENTION

It is an object of the present invention to provide a base station apparatus and radio communication method, which are easy to control, resistant to fading in a mobile communication environment and capable of changing the number of terminals accommodated with variable directivities.

A main subject of the present invention is to increase the subscriber capacity in the system, taking account of a good reception characteristic of a communication apparatus with variable directivities, by having the communication apparatus with variable directivities positively accommodate communications with terminals in poor reception conditions and reducing power of these terminals to reduce interference.

BEST MODE FOR CARRYING OUT THE INVENTION

With reference now to the attached drawings, embodiments of the present invention are explained in detail below.

Embodiment 1

Figure 1:
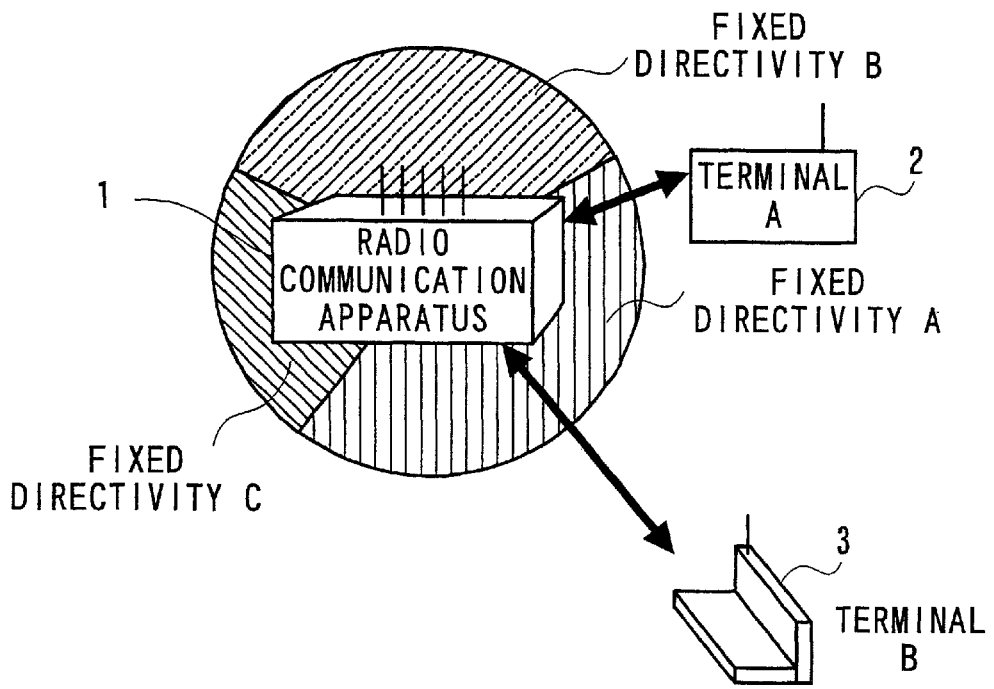
FIG. 1 illustrates a model of a conventional radio communication system.
Figure 2:
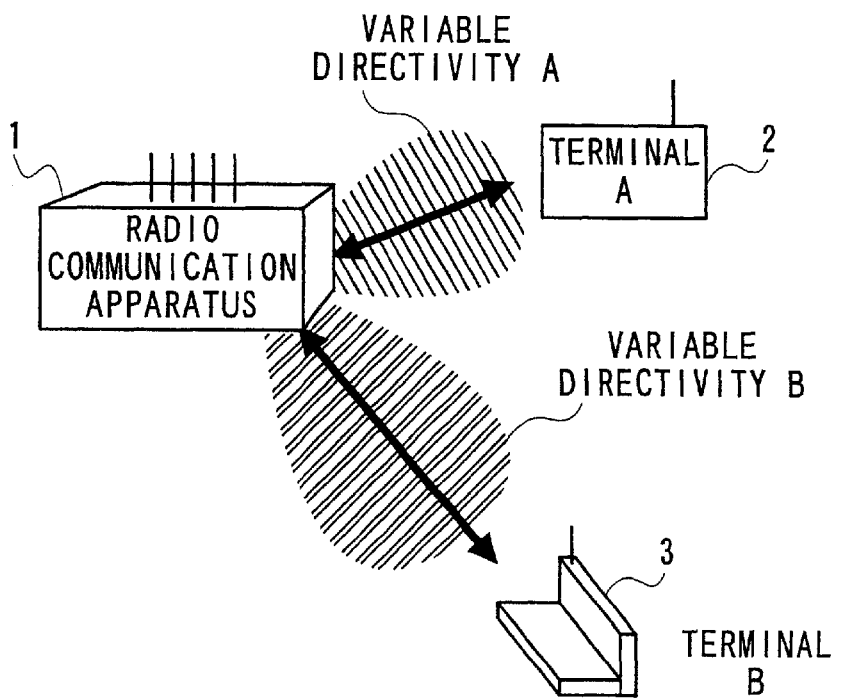
FIG. 2 illustrates another model of a conventional radio communication system.
Figure 3:
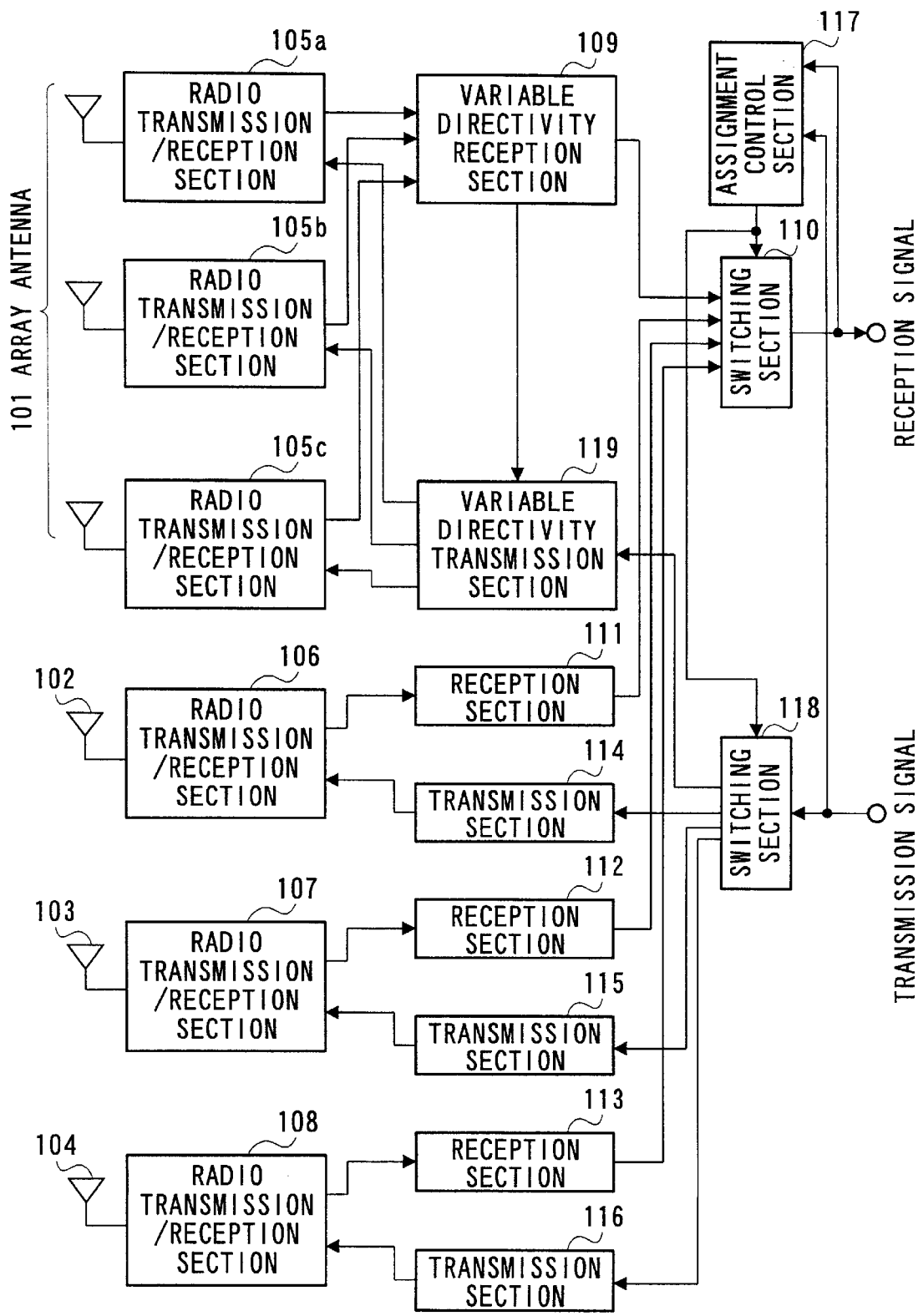
FIG. 3 is a block diagram showing a configuration of a base station apparatus according to Embodiment 1 of the present invention.

FIG. 3 is a block diagram showing a configuration of a base station apparatus according to Embodiment 1 of the present invention. In the base station apparatus shown in FIG. 3, signals received by array antenna 101 are subjected to amplification, frequency conversion and A/D conversion by radio transmission/reception sections 105a to 105c. These signals are sent to variable directivity reception section 109 in which a plurality of directivities is formed and reception processing is carried out according to these directivities. Then, of the results of reception with directivity, the directivity corresponding to the largest reception power of a desired signal is selected and demodulated. The demodulation result is sent to switching section 110.

Signals received by sector antennas 102 to 104 are subjected to amplification, frequency conversion and A/D conversion by radio transmission/reception sections 106 to 108, respectively and these signals are demodulated by reception sections 111 to 113 and the demodulation results are sent to switching section 110. Switching section 110 gathers and outputs the reception signals into a single signal line.

Assignment control section 117 controls assignment of the transmission signal to array antenna 101 or sector antennas 102 to 104. If the transmission signal is assigned to the sector antennas, the transmission signal is modulated by one of transmission sections 114 to 116, subjected to quadrature modulation, frequency conversion and amplification by one of radio transmission/reception sections 106 to 108 and transmitted from one of antennas 102 to 104.

On the other hand, if the transmission signal is assigned to the array antenna, the transmission signal is modulated by variable directivity transmission section 119, multiplied by a directivity selected by variable directivity reception section 109 and sent to radio transmission/reception sections 105a to 105c. The transmission signal is subjected to quadrature modulation, frequency conversion and amplification by the transmission section and transmitted from array antenna 101.

Figure 4:
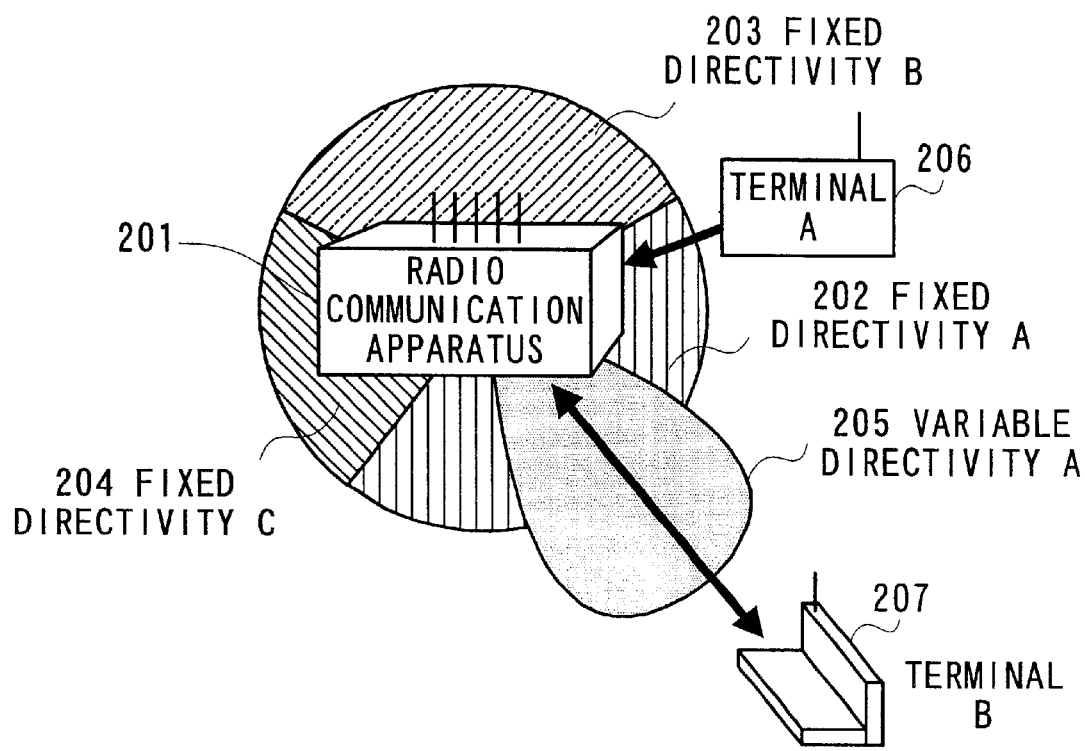
FIG. 4 illustrates a model of a system according to the embodiment of the present invention.

FIG. 4 is an illustration showing a directivity model in the base station apparatus according to this embodiment of the present invention (the same applies to the rest of embodiments). Base station 201 carries out communications with fixed directivities, for example, in three directions of sector antenna (fixed directivity A) 202, sector antenna (fixed directivity B) 203 and sector antenna (fixed directivity C) 204, and a communication with variable directivity in one direction of variable directivity 205. For example, this radio communication system carries out a radio communication with terminal 206 using sector antenna 202 and a radio communication with terminal 207 using array antenna (variable directivity antenna) 205.

Then, the operation of the base station apparatus with the above configuration is explained.

On the receiving side, signals received from array antenna 101 are subjected to amplification, frequency conversion and A/D conversion by radio transmission/reception sections 105a to 105c and sent to variable directivity reception section 109 in which a plurality of directivities are formed.

The directivity formation method here is described in "Antenna Engineering Handbook" (published by Ohmsha, Oct. 30, 1980) pp.200–205. That is, suppose N antennas simply spaced at regular intervals (d) on a straight line. Directivities can be expressed as shown in expressions (1) to (3). Expression (1) is a deformation of expression 3·3 of the reference above, expression (2) corresponds to expression 3·4 of the reference and expression 3 is a new description.

$$E(u) = \sum_{n=0}^{N-1} I_n \exp(jnu) \qquad (1)$$

$$= \sum_{n=0}^{N-1} I_n \exp(-jnkd\cos\theta_0)\exp(jnkd\cos\theta)$$

$$= \sum_{n=0}^{N-1} I'_n \exp(jnkd\cos\theta)$$

$$u = kd(\cos\theta - \cos\theta_0) \qquad (2)$$

$$I_n' = I_n \exp(-jnkd\cos\theta_0) \qquad (3)$$

Where In' denotes a current given to the nth antenna (complex number having an amplitude and phase), k denotes the number of signals, θ0 denotes a direction in which directivity is directed, and θ denotes a variable to draw directivity. For brevity, suppose In is in-phase and has a same amplitude, that is, In=1.0. By giving each antenna exp(−jnkd·cos θ0) it is possible to direct the directivity in the θ0 direction.

Figure 5:
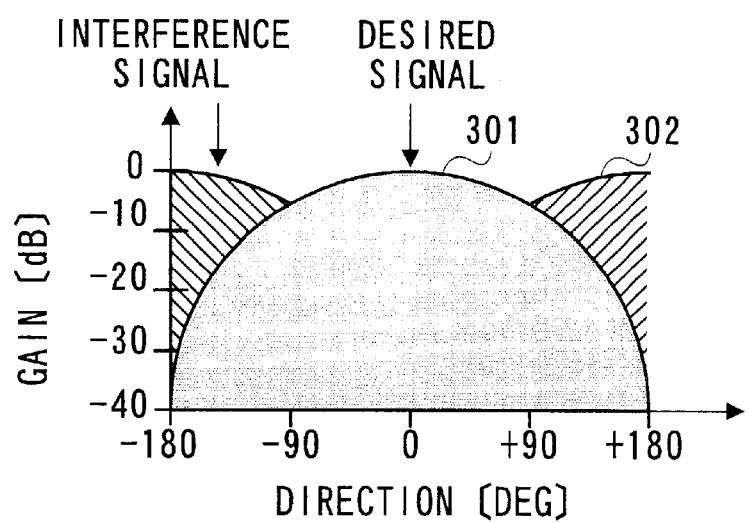
FIG. 5 illustrates a relation between a gain and direction in the base station apparatus according to the embodiment above.
Figure 6:
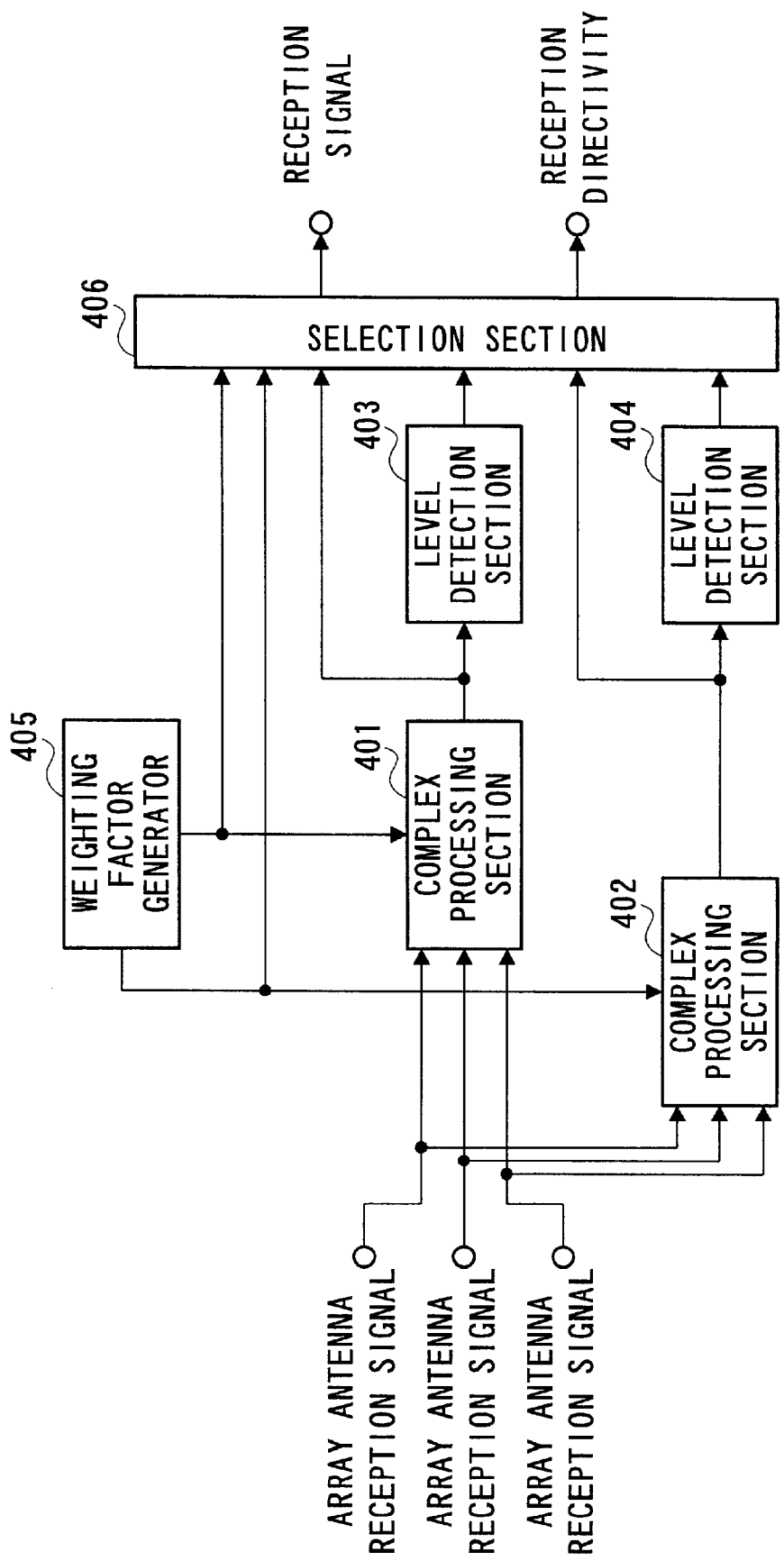
FIG. 6 is a block diagram showing a directivity formation section of the base station apparatus according to the embodiment above.

Through such calculations, a plurality of weighting factors is prepared for every direction of arrival and reception with directivity is carried out using these weighting factors. For example, as shown in FIG. 5, a case where weighting factors are prepared to form two directivities 301 and 302 is explained. More specifically, an outline of operation for reception with directivity is explained using FIG. 6.

Array antenna reception signals are input to complex processing circuits 401 and 402. These array antenna reception signals correspond to the signals input from radio transmission/reception signals 105a to 105c to variable directivity reception section 109. Complex processing circuit 401 multiplies the array antenna reception signals by the weighting factors generated by weighting factor generator 405 using expression (3) above to form directivity 301. That is, one array antenna reception signal is multiplied by a weighting factor calculated from expression (3) above when n=0, another array antenna reception signal is multiplied by a weighting factor calculated from expression (3) above when n=1, and the other array antenna reception signal is multiplied by a weighting factor calculated from expression (3) above when n=2. These multiplication results are added up.

Likewise, complex processing circuit 402 multiplies the array antenna reception signals by the weighting factors generated by weighting factor generator 405 using expression (3) above to form directivity 302. That is, one array antenna reception signal is multiplied by a weighting factor calculated from expression (3) above when n=0, another array antenna reception signal is multiplied by a weighting factor calculated from expression (3) above when n=1, and the other array antenna reception signal is multiplied by a weighting factor calculated from expression (3) above when n=2. These multiplication results are added up.

Then, reception power of the desired signals of respective combined signals is measured by level detection sections 403 and 404 and these measurement results are sent to selection section 406. Selection section 406 outputs the combined signal and reception directivity of greater reception power of the desired signals. Here, if the desired signals have almost the same reception power as the measurement results, selection section 406 selects the one with the greater signal-to-interference ratio. Furthermore, weighting factors generated by weighting factor generator 405 are also sent to selection section 406. These reception signals correspond to signals sent from variable directivity reception section 109 to switching section 110 in FIG. 3 and the reception directivity corresponds to signals sent from variable directivity reception section 109 to variable directivity transmission section 119 in FIG. 3.

On the transmitting side, assignment control section 117 performs control of assigning the transmission signal to sector antennas 102 to 104 or array antenna 101. When assigned to sector antennas 102 to 104, the transmission signal is modulated by one of transmission sections 114 to 116 and subjected to quadrature modulation, frequency conversion and amplification by one of radio transmission/reception sections 106 to 108 and sent via one of sector antennas 102 to 104. The signal flow in this case is as shown in FIG. 3.

If array antenna 101 is selected, the transmission signal is modulated by variable directivity transmission section 119, subjected to quadrature modulation, frequency conversion and amplification by radio transmission/reception sections 105a to 105c and sent from array antenna 101.

Then, the assignment method in the base station apparatus above is explained. Assignment control section 117 determines whether to assign the sector antennas or array antenna as the reception antenna according to the following method:

First, a first assignment method is explained.

Terminals with small interference with other terminals such as terminals carrying out voice communication and low-speed data communication are accommodated by the sector antennas (with fixed directivity), while terminals with large interference with other terminals such as terminals carrying out high-speed data are accommodated by the array antenna (with variable directivity). In particular, when the sector antennas are assigned as the reception antennas, since the sector antennas are configured by a plurality of sectors, it is preferable to assign them to directions in which the uplink control channel is received with the best quality.

When controlling the assignment of antennas from the transmission signal, information on the information speed in the transmission signal is sent to assignment control section 117. Assignment control section 117 controls switching sections 110 and 118 according to the first assignment method.

On the other hand, when controlling the assignment of antennas from the reception signal, information on the information speed (data rate) in the reception signal is sent to assignment control section 117. Assignment control section 117 controls switching sections 110 and 118 according to the first assignment method.

Here, the data rate of the reception signal is measured and assignment processing is performed considering that the higher the data rate, the greater the interference with other terminals and the lower the data rate, the smaller the interference with other terminals. However, it is also possible to find the level of interference with other terminals using a different method and carry out assignment processing based on the result.

Doing so, it is possible to narrow the transmission directivity for terminals with a large amount of interference, narrow the spatial area that gives interference and thus prevent deterioration of the reception quality of other terminals. Furthermore, using the array antenna with variable directivity, it is not necessary to transmit to a plurality of sectors for diversity handover between fixed CDMA sectors and it is possible to prevent the subscriber capacity from being reduced due to diversity handover. Moreover, in a CDMA communication if a communication is carried out at high speed, it is necessary to increase transmit power, but it is possible to narrow the reception directivity for terminals with large interference and improve the reception quality of terminals communicating high-speed data, thereby allowing the communication range to be broadened.

Then, the second assignment method is explained.

Terminals with small interference with other terminals such as terminals carrying out voice communication and low-speed data communication are accommodated by the sector antennas, while terminals with poor reception quality are accommodated by the array antenna. In particular, when the sector antennas are assigned as the reception antennas, since the sector antennas are configured by a plurality of antennas, it is preferable to assign them to directions in which the uplink control channel is received with the best quality.

When controlling the assignment of antennas from the transmission signal, information on the information speed in the transmission signal is sent to assignment control section 117. Assignment control section 117 controls switching sections 110 and 118 according to the second assignment method.

On the other hand, when controlling the assignment of antennas from the reception signal, information on the information speed in the reception signal is sent to assignment control section 117. Here, the terminal apparatus is provided with a section for broadcasting the average reception level of a perch channel, which is a broadcast channel to determine whether the terminal apparatus is far from the base station or not. The terminal apparatus measures the average reception level of the perch channel. Then, the terminal apparatus broadcasts this average reception level of the perch channel to the base station over the uplink. The base station decodes the information of the average reception level, which is the reception quality, and sends the information on this average reception level to assignment control section 117. Assignment control section 117 controls switching sections 110 and 118 according to the second assignment method.

Here, the reception quality is measured using the perch channel average reception level, but it is also possible to measure the reception quality using a frame error rate based on a CRC bit error determination or signal-to-interference ratio or other quality parameters.

Doing so, it is possible to improve the quality of communications with terminals with poor communication quality preferentially.

Then, the third assignment method is explained.

Terminals with small interference with other terminals such as terminals carrying out voice communication and low-speed data communication are accommodated by the sector antennas, while, of terminals with large interference with other terminals such as high-speed data communication, terminals located far are accommodated by the array antenna preferentially. In particular, this is effective when the number of terminals carrying out a high-speed communication exceeds the number of communication apparatuses with provided variable directivities. Furthermore, when the sector antennas are assigned, since the sector antennas are configured by a plurality of sectors, it is preferable to assign them to directions in which the uplink control channel is received with the best quality.

When controlling the assignment of antennas from the transmission signal, information on the information speed in the transmission signal is sent to assignment control section 117. Assignment control section 117 controls switching sections 110 and 118 according to the third assignment method.

On the other hand, when controlling the assignment of antennas from the reception signal, information on the information speed in the reception signal is sent to assignment control section 117. Here, the terminal apparatus is provided with, for example, a section for broadcasting the average reception level of a perch channel, which is a broadcast channel to determine whether the terminal apparatus is far from the base station or not. The terminal apparatus broadcasts this average reception level of the perch channel to the base station over the uplink. The base station decodes the information of the average reception level, which is the reception quality, and sends the information of this average reception level to assignment control section 117. Assignment control section 117 controls switching sections 110 and 118 according to the third assignment method.

In this case, if no transmit power control is performed, it is determined by the level of the average reception level whether the terminal is located far or not. That is, a terminal whose average reception level is low is determined as a far terminal and this terminal is preferentially accommodated by the array antenna. On the other hand if transmit power control is performed, the average reception level is constant within a range in which transmit power control is possible, and therefore it is determined whether the terminal is located far or not by the average reception level within a range in which transmit power control is impossible in the same way as shown above.

In this way, terminals with poorer communication quality are accommodated by the provided communication apparatus with variable directivity. As a result, it is possible to preferentially improve the quality of communication with terminals with poor communication quality.

Then, the fourth assignment method is explained.

Terminals with small interference with other terminals such as terminals carrying out voice communication and low-speed data communication are accommodated by the sector antennas, while, of terminals carrying out high-speed data communication, terminals carrying out faster data communication are accommodated by the array antenna preferentially. In particular, this is effective when the number of terminals carrying out a high-speed data communication exceeds the number of provided communication apparatuses with variable directivity. Furthermore, when terminals are assigned to the sector antennas, since the sector antennas are configured by a plurality of sectors, it is preferable to assign them to directions in which the uplink control channel is received with the best quality.

When controlling the assignment of antennas from the transmission signal, information on the information speed in the transmission signal is sent to assignment control section 117. Assignment control section 117 controls switching sections 110 and 118 according to the fourth assignment method. That is, communication of a terminal carrying out a communication at a higher data rate is preferentially accommodated by the array antenna.

On the other hand, when controlling the assignment of antennas from the reception signal, information on the information speed in the reception signal is sent to assignment control section 117. Assignment control section 117 controls switching sections 110 and 118 according to the fourth assignment method.

Using such an assignment method, terminals carrying out faster data communication, that is, terminals with a larger amount of interference are accommodated by the provided communication terminal with variable directivity. As a result, it is possible to narrow transmission directivity toward terminals with a large amount of interference, narrow a spatial area that gives interference and thus prevent deterioration of reception quality of other terminals.

Furthermore, because of diversity handover between CDMA sectors, it is not necessary to send data to a plurality of sector antennas and it is possible to prevent the subscriber capacity from being reduced due to diversity handover. Furthermore, in the CDMA communication, if communication is carried out at high speed, it is necessary to increase transmit power, but it is possible to narrow the reception directivity toward terminals with large interference and improve the reception quality of terminals communicating high-speed data, thereby broadening the communication range. This also makes control simpler and makes the system more resistant to fading in a mobile communication environment.

In W-CDMA, a transmission rate may be broadcast from the network side or a variable rate may be used. In either case, the rate is identified and the assignment process above is carried out based on the identification result. That is, the transmission rate is identified by receiving information of the rate when broadcast from the network side and by measuring the rate in the case of a variable rate.

Embodiment 2

Figure 7:
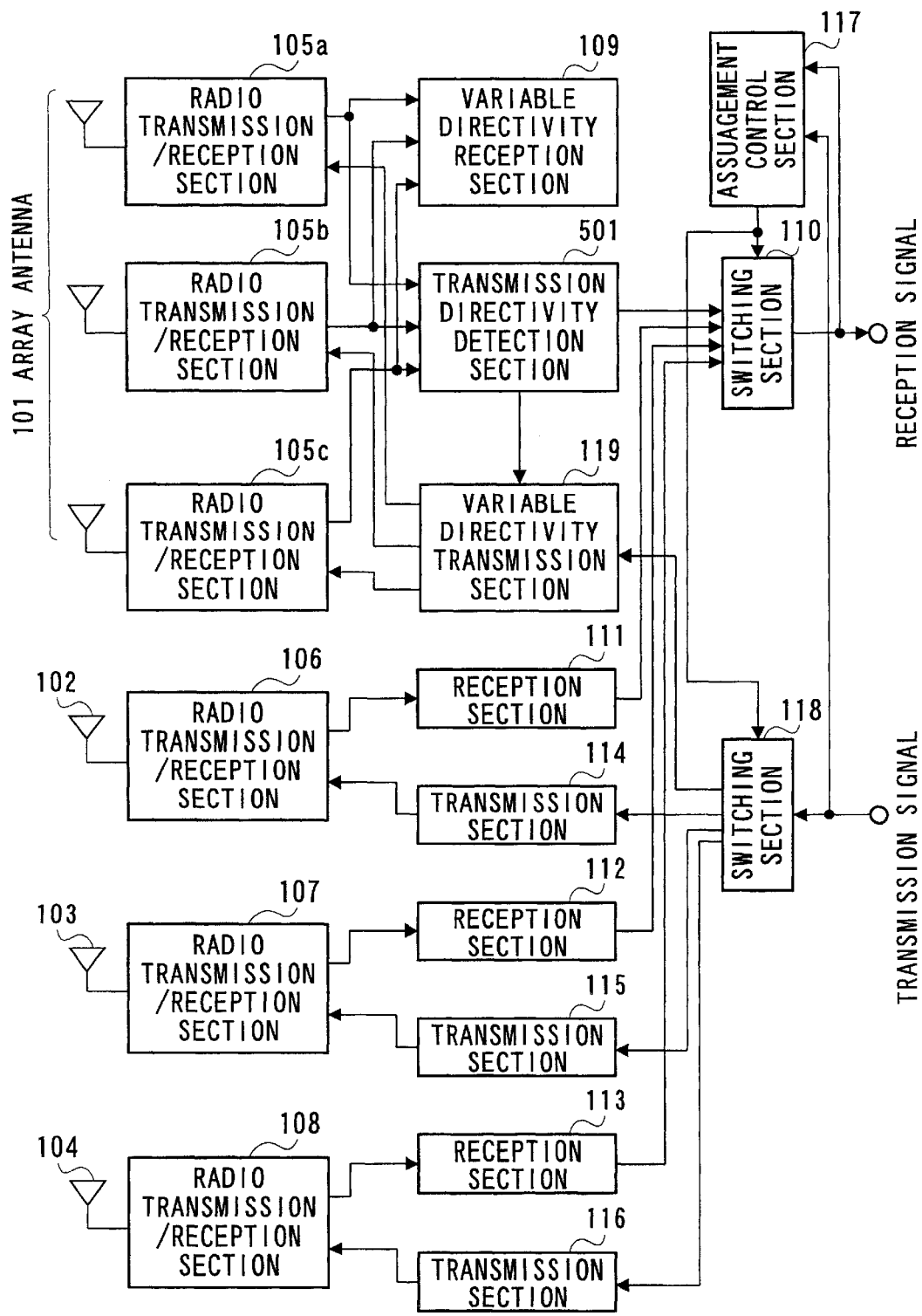
FIG. 7 is a block diagram showing a configuration of a base station apparatus according to Embodiment 2 of the present invention.

FIG. 7 is a block diagram showing a configuration of a base station apparatus according to Embodiment 2 of the present invention. The parts in FIG. 7 identical to those in FIG. 3 are assigned the same codes as those in FIG. 3 and their detailed explanations are omitted.

The base station apparatus shown in FIG. 7 is provided with transmission directivity detection section 501 that detects transmission directivity based on the reception signal from radio transmission/reception sections 105a to 105c of array antenna 101. Information on the transmission directivity detected by this transmission directivity detection section 501 is sent to variable directivity transmission section 119 in which transmission directivities are changed.

The operation of the base station apparatus according to Embodiment 2 of the present invention is explained using FIG. 7.

Signals received by array antenna 101 are subjected to amplification, frequency conversion and A/D conversion by radio transmission/reception sections 105a to 105c and sent to variable directivity reception section 109. Here, variable directivity reception section 109 is explained using FIG. 8. This variable directivity reception section is implemented by an adaptive array antenna. This adaptive array antenna is described in "Waveform Equalization Technology for Digital Mobile Communications" (published by Triceps Corporation on Jun. 1, 1996, ISBN4-88657-801-2), etc.

Figure 10:
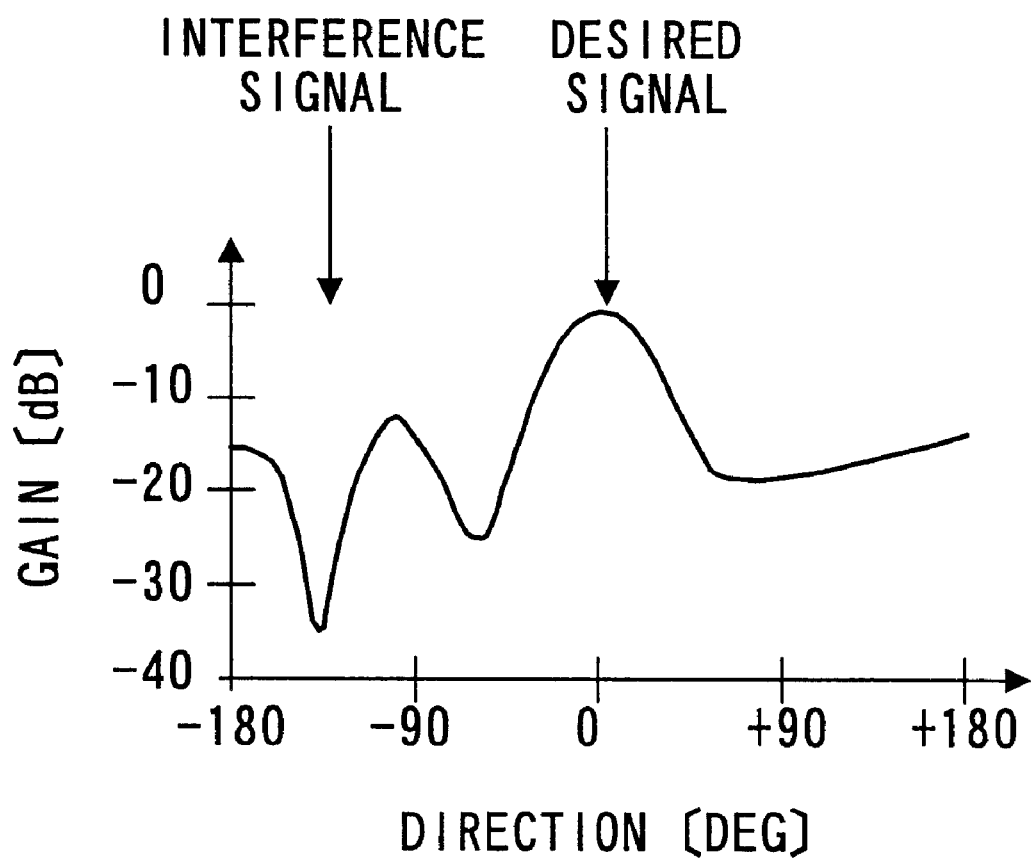
FIG. 10 is a drawing to explain a directivity of the base station apparatus according to the embodiment above.

For example, if adaptive array antenna processing is carried out so as to extract a desired signal, directivity is directed to the desired signal and a portion with a small gain (called "null") is produced for an unnecessary signal (a signal identical to the desired signal, but arrives at a different time because it travels through a different propagation path, or signal from another transmitter). An example of this directivity is shown in FIG. 10.

Figure 8:
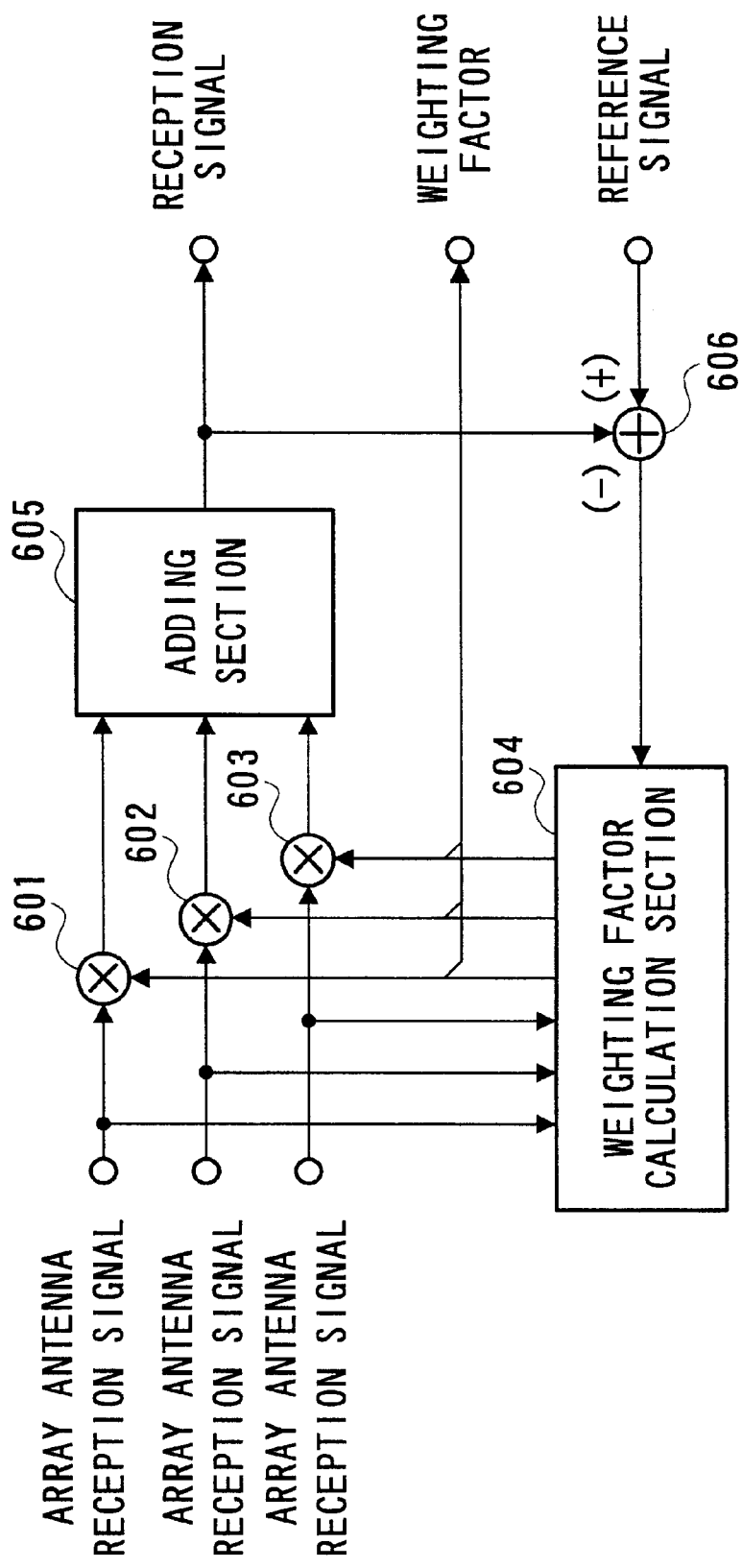
FIG. 8 is a block diagram showing a transmission directivity detection section of the base station apparatus according to the embodiment above.

In variable directivity reception section 109 shown in FIG. 8, the signals received by array antenna are sent to weighting factor calculation section 604 in which weighting factors are calculated. These weighting factors are subjected to complex multiplication with the array antenna reception signals by complex multipliers 601 to 603. These multiplication results are added up by adding section 605. This addition result becomes a reception signal. This corresponds to the output of variable directivity reception section 109.

On the other hand, differential circuit 606 calculates a difference between the addition result and a reference signal and this difference is sent to weighting factor calculation section 604 as an error signal. Weighting factor calculation section 604 updates weighting factors based on the error signal.

On the other hand, a signal received by sector antenna 102 is subjected to amplification, frequency conversion and A/D conversion by radio transmission/reception section 106, demodulated by reception section 111 and the demodulation result is sent to switching section 110. A signal received by sector antenna 103 is subjected to amplification, frequency conversion and A/D conversion by radio transmission/reception section 107, demodulated by reception section 112 and the demodulation result is sent to switching section 110. A signal received by sector antenna 104 is subjected to amplification, frequency conversion and A/D conversion by radio transmission/reception section 108, demodulated by reception section 113 and the demodulation result is sent to switching section 110. Switching section 110 gathers all reception signals together into one and outputs.

On the transmitting side, assignment control section 117 performs control of assigning the transmission signal to sector antennas 102 to 104 or array antenna 101. When assigned to sector antennas 102 to 104, the transmission signal is modulated by one of transmission sections 114 to 116, subjected to quadrature modulation, frequency conversion and amplification by one of radio transmission/reception sections 106 to 108 and transmitted by one of sector antennas 102 to 104. The signal flow in this case is as shown in FIG. 7.

If array antenna 101 is selected, the transmission signal is modulated by variable directivity transmission section 119. Furthermore, the directivity information selected by transmission directivity detection section 501 is sent to variable directivity transmission section 119 and directivity is changed based on this selected directivity information. The transmission signal is subjected to quadrature modulation, frequency conversion and amplification by radio transmission/reception sections 105a to 105c and transmitted from array antenna 101.

Here, the method of assignment of sector antennas 102 to 104 and array antenna 101 is the same as that of Embodiment 1.

Figure 9:
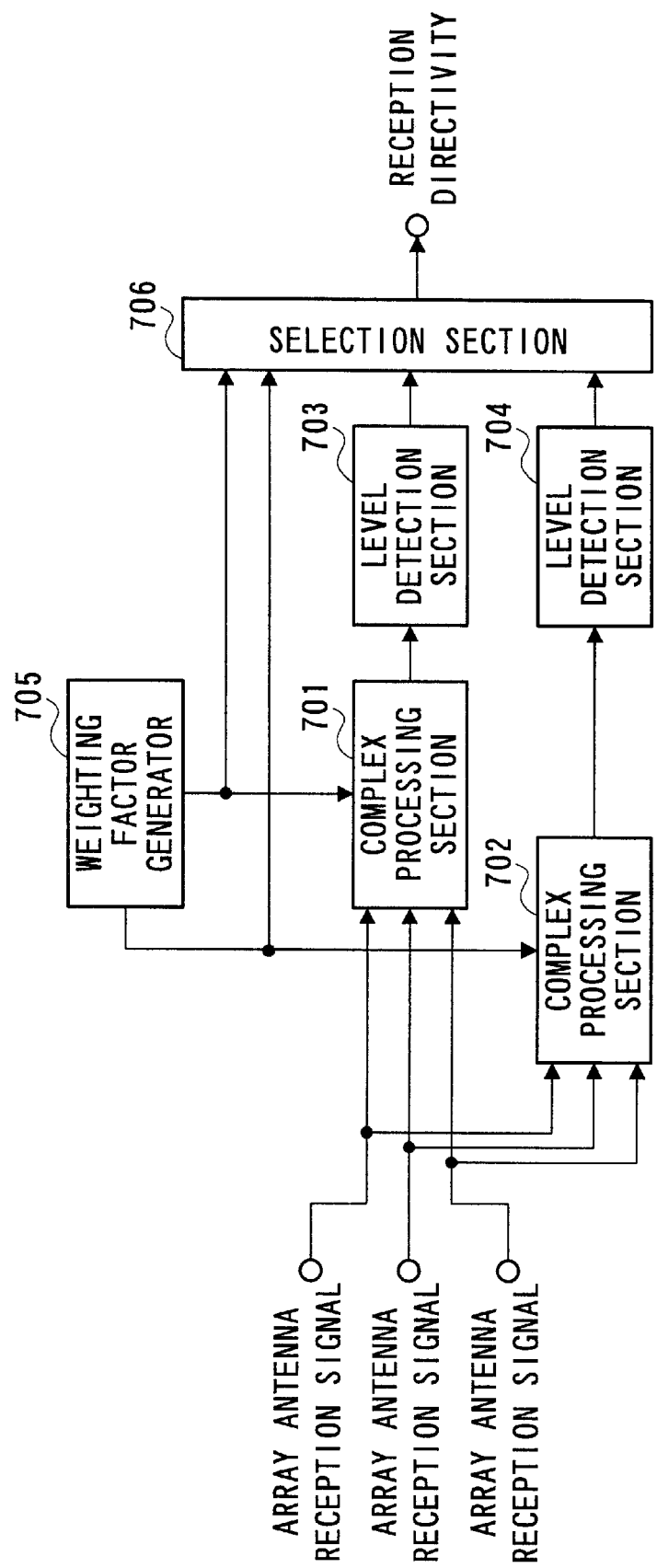
FIG. 9 is a block diagram showing a transmission directivity detection section of a base station apparatus according to Embodiment 3 of the present invention.

Then, transmission directivity detection section 501 is explained using FIG. 9. Transmission directivity is detected by receiving signals with a plurality of directivities, selecting the directivity with maximum reception power of a desired signal from those directivities and this directivity is used as the directivity for downlink transmission. The method of forming directivity is the same as that of Embodiment 1.

Thus, transmission directivity detection section 501 prepares a plurality of weighting factors for every direction of arrival and carries out reception with directivity. For example, transmission directivity detection section 501 prepares weighting factors to form two directivities as shown in FIG. 5.

In transmission directivity detection section 501, the array antenna reception signals are input to complex processing sections 701 and 702. These array antenna reception signals correspond to the outputs of radio transmission/reception sections 105a to 105c.

Complex processing section 701 multiplies the array antenna reception signals by a weighting factor generated by weighting factor generator 705 using aforementioned expression (3) to form directivity 301. That is, the weighting factor calculated from aforementioned expression (3) with n=0 is multiplied on the reception signal of one array antenna, the weighting factor calculated from aforementioned expression (3) with n=1 is multiplied on the reception signal of another array antenna and the weighting factor calculated from aforementioned expression (3) with n=2 is multiplied on the reception signal of the other array antenna. These multiplication results are added up.

Likewise, complex processing section 702 multiplies the array antenna reception signals by the weighting factor generated by weighting factor generator 705 using aforementioned expression (3) to form directivity 302. That is, the weighting factor calculated from aforementioned expression (3) with n=0 is multiplied on the reception signal of one array antenna, the weighting factor calculated from aforementioned expression (3) with n=1 is multiplied on the reception signal of another array antenna and the weighting factor calculated from aforementioned expression (3) with n=2 is multiplied on the reception signal of the other array antenna. These multiplication results are added up.

Then, level detection sections 703 and 704 measure the desired signal reception power of their respective combined signals and send the measurement results to selection section 706. Selection section 706 selects and outputs the reception directivity corresponding to the greater desired signal reception power. If these combined signals have almost same desired signal reception power, the one with a greater signal-to-interference ratio is selected. This reception signal corresponds to the signal sent from variable directivity reception signal 109 to switching section 110.

This embodiment explains the case where an adaptive array antenna is used for the base station apparatus with the configuration shown in FIG. 7, but the same effect will also be obtained in a case where an adaptive array antenna is used for the base station apparatus with the configuration shown in FIG. 3.

Embodiment 3

This embodiment explains a case where a technique of estimating the direction of arrival of a reception signal is used to detect transmission directivity. The configuration of the base station apparatus in this embodiment is the same as that shown in FIG. 7. Therefore, operations other than detection of transmission directivity are the same as those in Embodiment 2 and so their detailed explanations are omitted.

Figure 11:
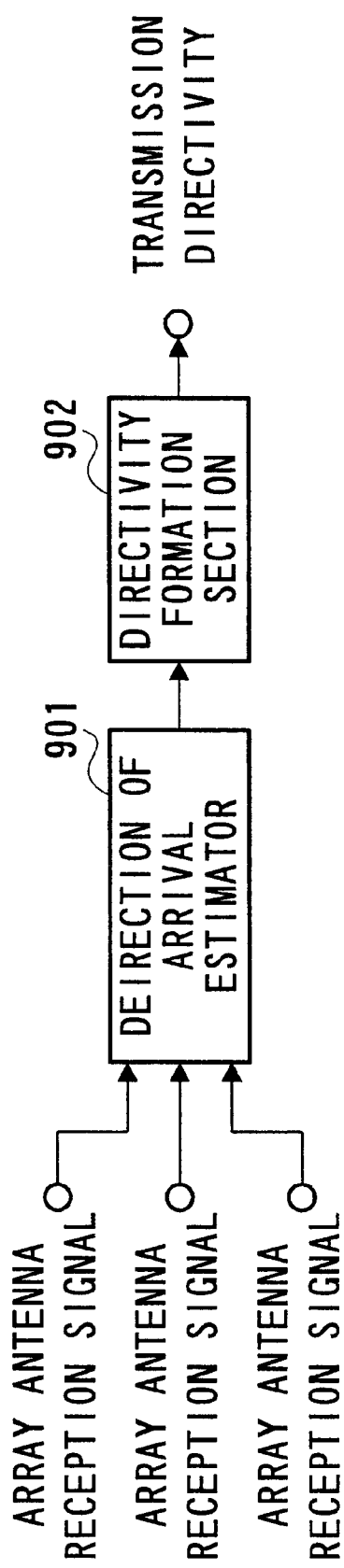
FIG. 11 is a block diagram showing a transmission directivity detection section of a base station apparatus according to Embodiment 4 of the present invention.

The transmission directivity detection section in this embodiment comprises direction of arrival estimator 901 and directivity formation section 902 as shown in FIG. 11. That is, transmission directivity is generated by direction of arrival estimator 901 estimating the direction of arrival of a reception signal and calculating the directivity based on the direction of arrival. More specifically, directivity formation section 902 assigns the direction detected by direction of arrival estimator 901 to θ0 in aforementioned expression (3) and calculates a weighting factor necessary to form directivity.

The direction of arrival estimation technique is described in "Introduction to Adaptive Signal Processing Technology Using Array Antenna and High Resolution Direction of Arrival Estimations " published by the Institute of Electronics, Information and Communication Engineers pp.62–76 (Oct. 30, 1997), etc.

The following effect is obtained from Embodiments 1 to 3 above.

The direction of arrival estimation technique can narrow transmission directivity toward terminals with large interference, narrow the spatial area that gives interference and prevent deterioration of reception quality of other terminals. Furthermore, diversity handover between CDMA fixed sectors further eliminates the need to transmit to a plurality of sectors, preventing the subscriber capacity from being reduced by diversity handover. In a CDMA communication, if a communication is carried out at high speed, it is necessary to increase transmit power but it possible to narrow the reception directivity toward terminals with large interference and improve the reception quality of terminals communicating high-speed data, thereby broadening the communication range.

Furthermore, the direction of arrival estimation technique can improve the quality of communication with terminals with poor communication quality preferentially. Furthermore, all communication apparatuses with variable directivity prepared as apparatuses accommodate terminals with poorer communication quality. Therefore, it is possible to improve the quality of communication with terminals with poor communication quality preferentially.

Furthermore, all communication apparatuses with variable directivity prepared as apparatuses accommodate terminals carrying out faster data communication, that is, terminals with a greater amount of interference. This makes it possible to narrow transmission directivity toward terminals with greater interference, narrow the spatial area that gives interference and prevent deterioration of reception quality of other terminals. Furthermore, diversity handover between CDMA fixed sectors further eliminates the need to transmit data to a plurality of sectors, preventing the subscriber capacity from being reduced by diversity handover.

Embodiment 4

Figure 12:
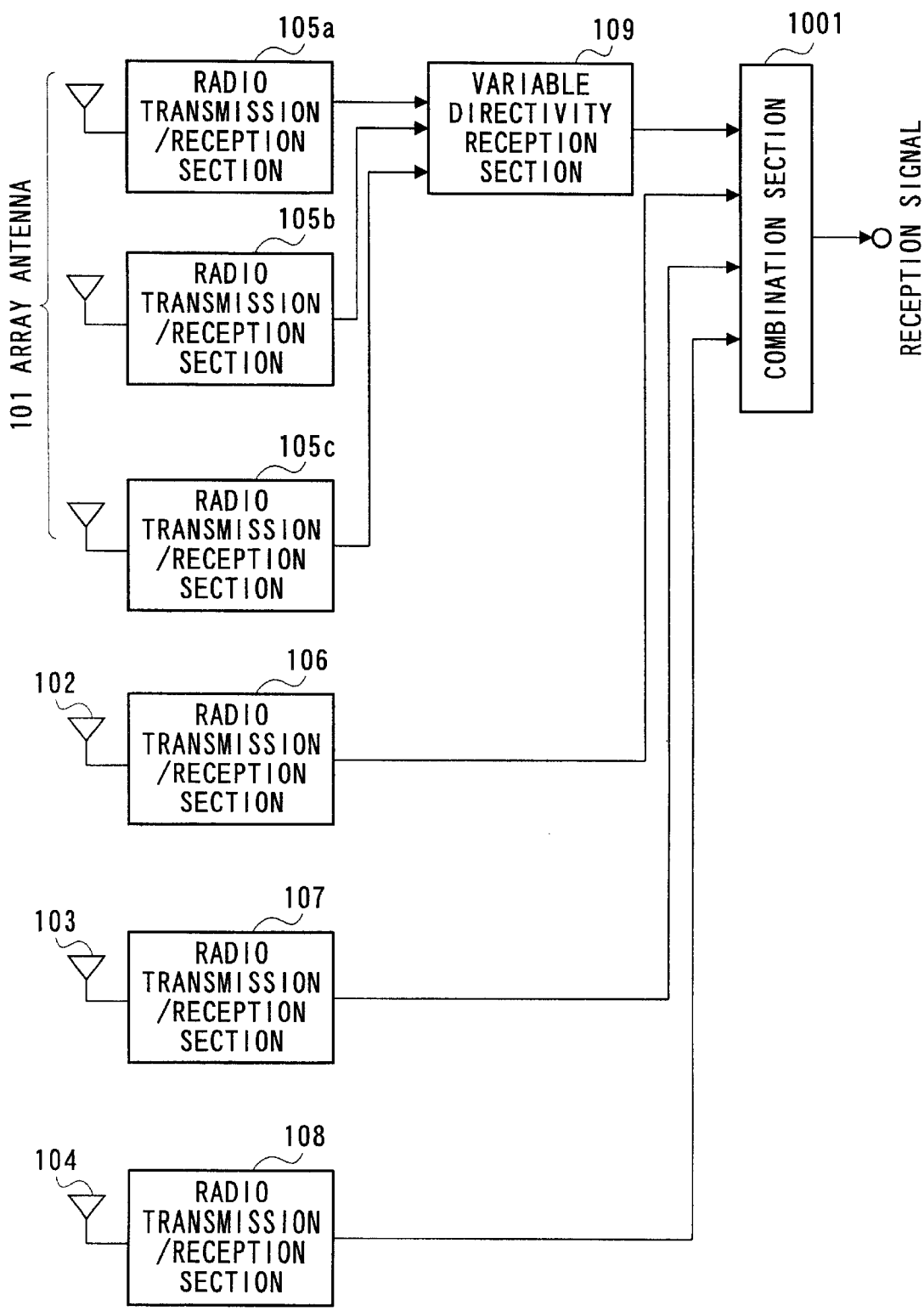
FIG. 12 is a block diagram showing a reception section of the base station apparatus according to Embodiment 4 of the present invention.

The base station apparatus in this embodiment is a case where signals received by sector antennas 102 to 104 and array antenna 101 are combined. FIG. 12 is a block diagram showing a configuration of a reception section of the base station apparatus according to Embodiment 4 of the present invention. The base station apparatus of this embodiment applies an adaptive array antenna to the base station apparatus with the configuration shown in FIG. 3. Therefore, the base station apparatus of this embodiment is the same as the embodiment above except for the section that combines reception signals, and so their detailed explanations are omitted.

The base station apparatus of this embodiment combines signals received by sector antennas 102 to 104 and array antenna 101 by combination section 1001. This combination section 1001 has a configuration shown in FIG. 16. In combination section 1001, envelope detection section 1401 detects the envelope of the output of variable directivity reception section 109 and phase detection section 1402 detects the phase of the output of variable directivity reception section 109. Phase rotation section 1403 corrects the phase of the reception signal based on the phase information detected by phase detection section 1402. Furthermore, the reception signal is amplified by amplifier 1404 based on the information of the envelope detected by envelope detection section 1401.

Figure 16:
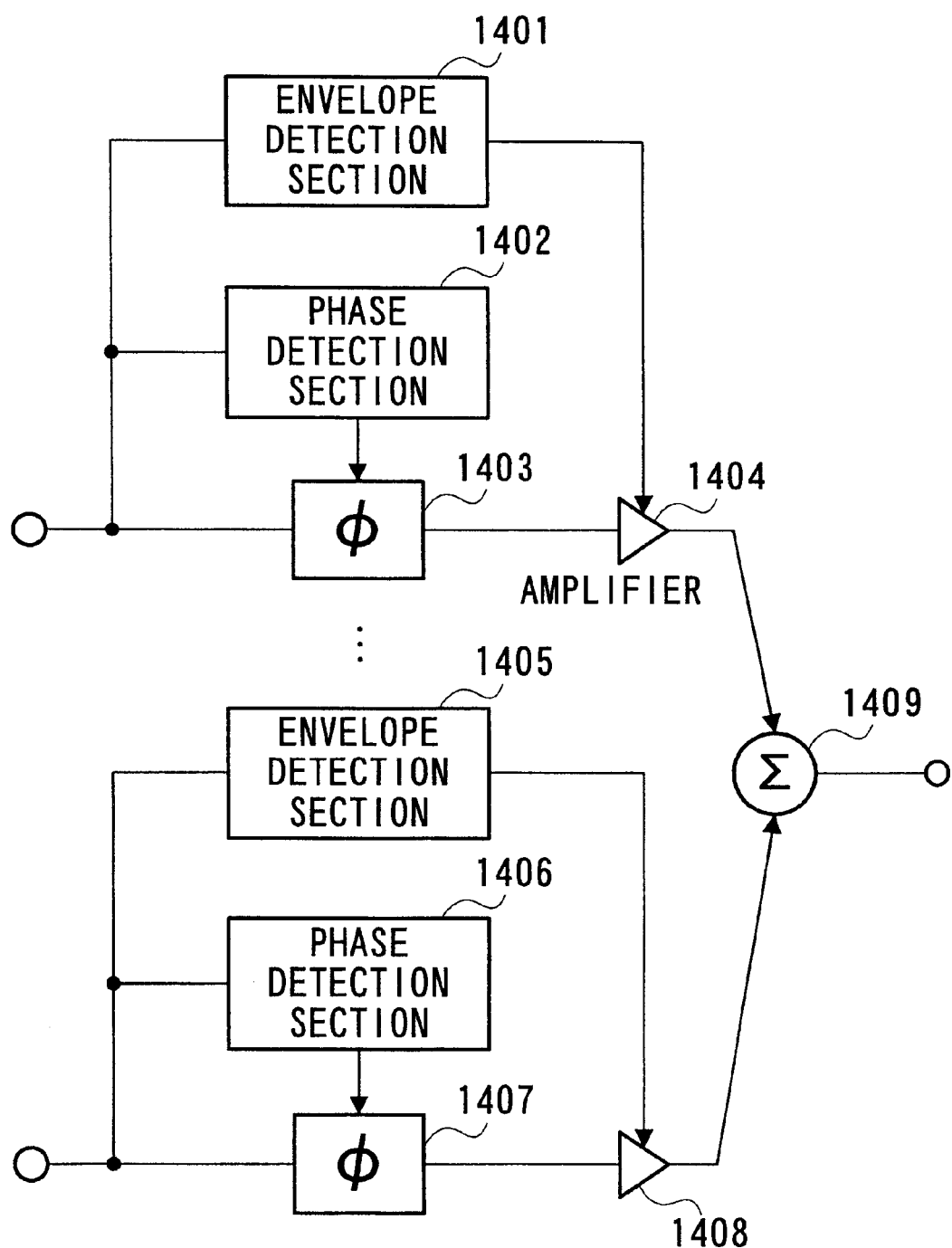
FIG. 16 is a block diagram showing a combination section of the base station apparatus according to Embodiment 4 of the present invention.

Likewise, also for reception signals of sector antennas 102 to 104, envelope detection section 1405 and phase detection section 1406 detect the envelope and phase, phase rotation section 1407 carries out phase correction and amplifier 1408 amplifies their respective reception signals (FIG. 16 only describes a portion corresponding to one sector antenna). Then, adder 1409 adds up the results corresponding to array antenna 101 and sector antennas 102 to 104.

Embodiment 5

This embodiment explains another example of combination of the outputs of array antenna 101 and sector antennas 102 to 104. The configuration and operation of other than the combination section are the same as those in Embodiment 4.

Figure 17:
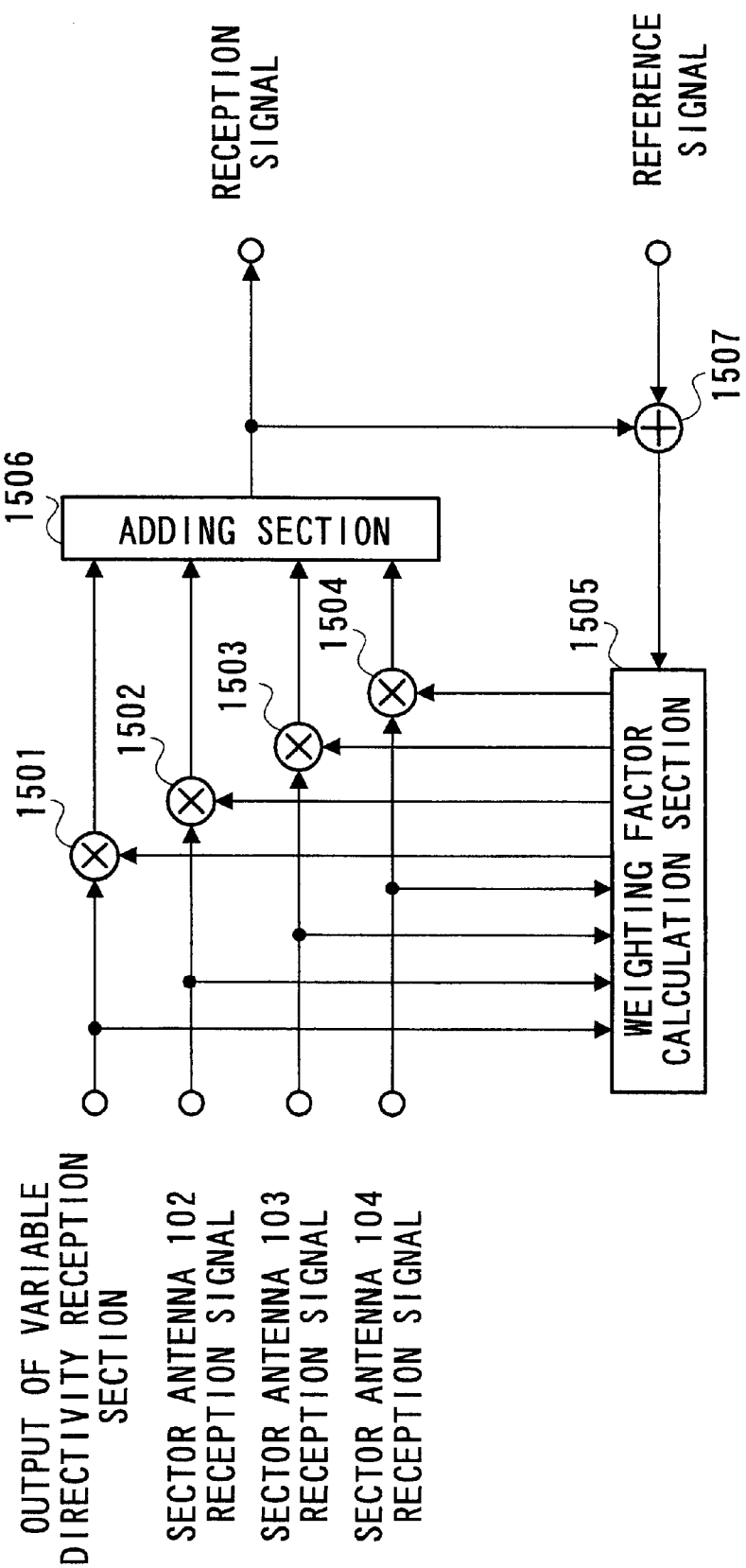
FIG. 17 is a block diagram showing a combination section of a base station apparatus according to Embodiment 5 of the present invention.

FIG. 17 shows a configuration of the combination section of the base station apparatus according to this embodiment. The combination section sends the output of variable directivity reception section 109 and the reception signals of sector antennas 102 to 104 to weighting factor calculation section 1505 in which weighting factors are calculated, and complex multipliers 1501 to 1504 multiply the output of variable directivity reception section 109 and the reception signals of sector antennas 102 to 104 by those weighting factors and adding section 1506 adds up their respective multiplication results. This addition result becomes the reception signal.

Differential section 1507 calculates a difference between a reference signal and the combined reception signal and sends the result to weighting factor calculation section 1505 as an error signal. Weighting coefficient calculation section 1505 updates weighting factors using array antenna reception signals and error signal.

Embodiment 6

This embodiment explains another example of combination of the outputs of array antenna 101 and sector antennas 102 to 104. The configuration and operation of other than the combination section are the same as those in Embodiment 4.

Figure 13:
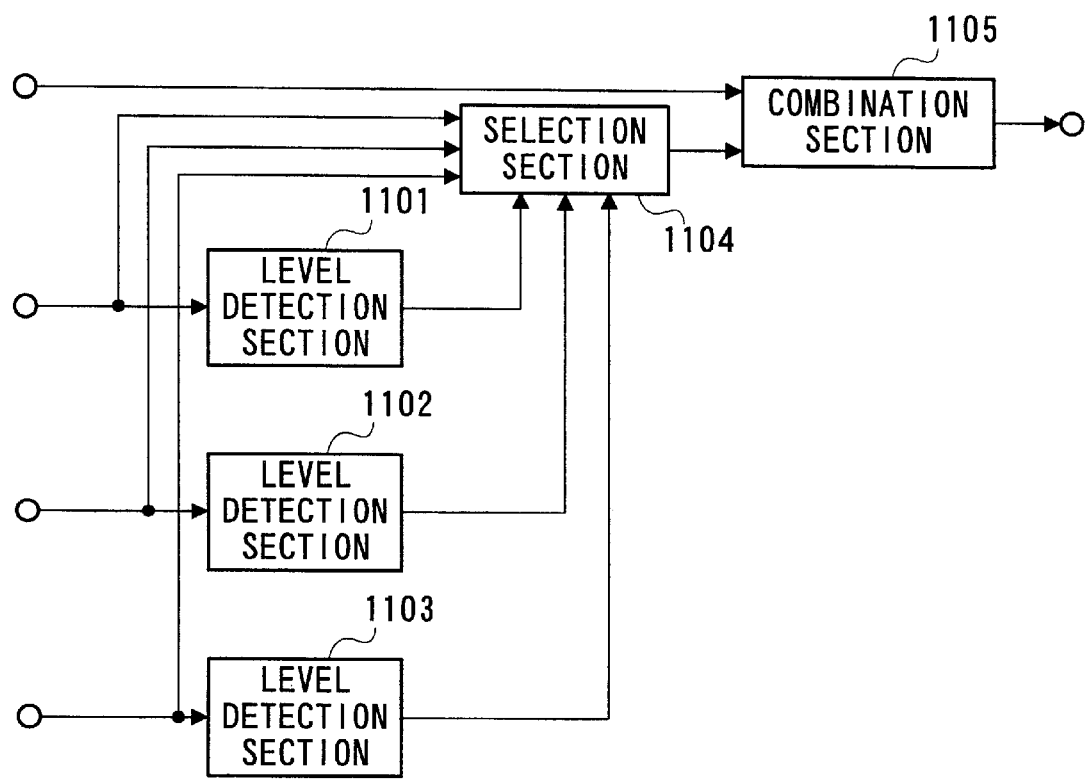
FIG. 13 is a block diagram showing a reception section of a base station apparatus according to Embodiment 6 of the present invention.

When sector antennas (fixed directivity) are placed in different directions as shown in FIG. 4, the reception quality of a desired signal varies depending on the direction. Thus, it is possible to limit signals to be combined beforehand. The reception section of the base station apparatus according to this embodiment has a configuration as shown in FIG. 13. Such a configuration can limit signals to be combined beforehand.

In this reception section, reception signals of sector antennas 102 to 104 are input to level detection sections 1101 to 1103 in which reception power is measured and the measurement results are sent to selection section 1104. Selection section 1104 selects signal whose level measured value exceeds a predetermined threshold and outputs the signal to combination section 1105. Combination section 1105 combines these signals according to the method explained in Embodiment 4. If the reception signals of the sector antennas include a desired signal and interference signal, the reception section measures reception power of the desired signal and sends the measurement result to selection section 1104.

The embodiment above explains the case where the combination method of Embodiment 4 is applied, but the same effect can be obtained also when the combination method of Embodiment 5 is applied.

Embodiments 4 to 6 above can compensate a drop of the level of reception signals due to fading by using the reception signals of the sector antennas without using a plurality of expensive array antennas.

Embodiment 7

Figure 14:
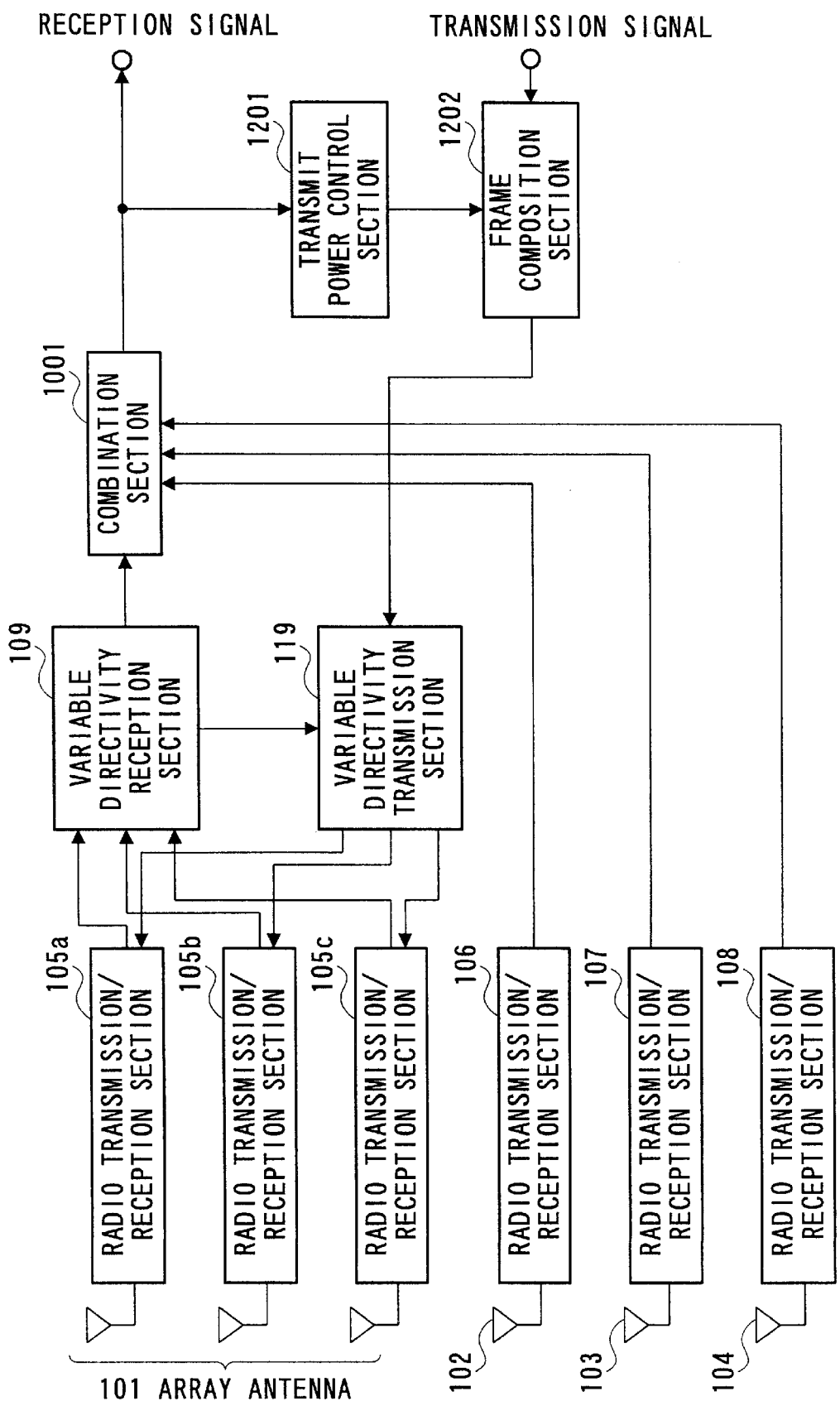
FIG. 14 is a block diagram showing a base station apparatus according to Embodiment 7 of the present invention.

This embodiment explains a case where signals are received using array antenna 101 and sector antennas 102 to 104 and transmitted only from array antenna 101. FIG. 14 is a block diagram showing a configuration of the base station apparatus according to Embodiment 7 of the present invention.

In this base station apparatus, array antenna 101 performs array antenna reception. Reception signals are subjected to amplification, frequency conversion and A/D conversion by radio transmission/reception sections 105a to 105c and sent to variable directivity reception section 109. Variable directivity reception section 109 performs processing using one of the methods explained in Embodiments 1 to 3.

Signals received by sector antennas 102 to 104 are subjected to amplification, frequency conversion and A/D conversion by radio transmission/reception sections 106 to 108 and sent to combination section 1001. Combination section 1001 performs combination using one of the methods explained in Embodiments 4 to 6. This combination result is sent to transmit power control section 1201.

Transmit power control section 1201 measures the reception quality of the combined signal. If this measurement result is equal to or greater than a predetermined threshold, transmit power control section 1201 sends such a control signal that reduces transmit power of a terminal apparatus, which is the other end of communication, to frame composition section 1202. If this measurement result is smaller than a predetermined threshold, transmit power control section 1201 sends such a control signal that increases transmit power of the terminal apparatus to frame composition section 1202.

There are methods of measuring the reception quality such as signal-to-interference ratio and block error rate that decodes CRC (Cyclic Redundancy Check) embedded in a reception signal, etc.

Then, frame composition section 1202 assigns the transmission signal and transmit power control signal to a transmit frame format and sends this transmission signal to variable directivity transmission section 119. Variable directivity transmission section 119 multiplies the transmission signal by a weighting factor according to one of the methods shown in Embodiments 1 to 3, sends this transmission signal to radio transmission/reception sections 105a to 105c of array antenna 101, carries out quadrature modulation, frequency conversion and amplification, and transmits from array antenna 101.

Embodiment 8

Figure 15:
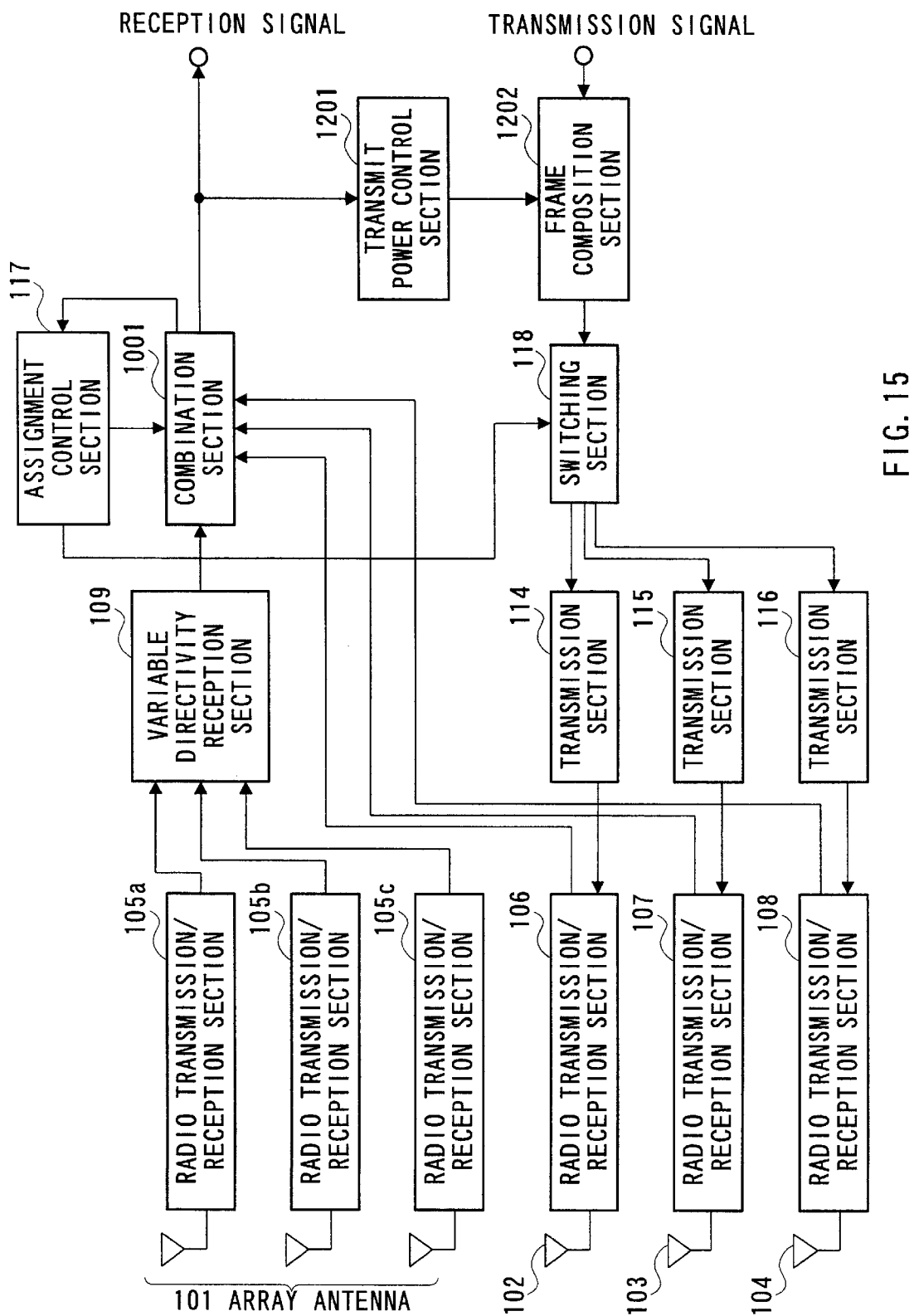
FIG. 15 is a block diagram showing a base station apparatus according to Embodiment 8 of the present invention.

This embodiment explains a case where signals are received using array antenna 101 and sector antennas 102 to 104 and transmitted only from sector antennas 102 to 104. FIG. 15 is a block diagram showing a configuration of the base station apparatus according to Embodiment 8 of the present invention.

In this base station apparatus, array antenna 101 performs array antenna reception. Reception signals are subjected to amplification, frequency conversion and A/D conversion by radio transmission/reception sections 105a to 105c and sent to variable directivity reception section 109. Variable directivity reception section 109 performs processing using one of the methods explained in Embodiments 1 to 3.

Signals received by sector antennas 102 to 104 are subjected to amplification, frequency conversion and A/D conversion by radio transmission/reception sections 106 to 108 and sent to combination section 1001. Combination section 1001 performs combination using one of the methods explained in Embodiments 4 to 6. This combination result is sent to transmit power control section 1201.

Transmit power control section 1201 measures the reception quality of the combined signal. If this measurement result is equal to or greater than a predetermined threshold, transmit power control section 1201 sends such a control signal that reduces transmit power of the terminal apparatus, which is the other end of communication, to frame composition section 1202. If this measurement result is lower than the predetermined threshold, transmit power control section 1201 sends such a control signal that increases transmit power of the terminal apparatus to frame composition section 1202.

There are methods of measuring the reception quality such as a signal-to-interference ratio and block error rate that decodes CRC (Cyclic Redundancy Check) embedded in a reception signal, etc.

Then, frame composition section 1202 assigns the transmission signal and transmit power control signal to a transmit frame format. On the other hand, the signal combined by combination section 1001 is sent to assignment control section 117, and assignment control section 117 assigns the sector antenna corresponding to the maximum reception level calculated by combination section 1001 to a transmission antenna. This assignment information is sent to switching section 118 and the sector antennas are switched based on the assignment information. The transmission signal is modulated by the assigned transmission section, subjected to quadrature modulation, frequency conversion and amplification and transmitted from the antenna.

Embodiments 7 and 8 above display the following effects:

It is possible to compensate drops in the reception signal level due to fading by using the reception signals of the sector antennas instead of using a plurality of expensive array antennas.

Furthermore, since drops in the reception signal level due to fading are not compensated by means of transmit power control of terminals, it is possible to reduce the response speed of transmit power control of the transmission amplifier of the terminal and reduce transmit power of the terminal.

Furthermore, it is also possible to expand the system according to the number of terminals accommodated by expensive transmission/reception apparatuses with variable directivity.

Embodiment 9

The variable directivity reception section and variable directivity transmission section are expensive because they carry out complicated calculations at high speed. Therefore, this embodiment adopts such a configuration of a base station apparatus that has a common radio transmission/reception section, expands the variable directivity reception section and variable directivity transmission section making it possible to add the number of terminals accommodated with variable directivities.

Figure 18:
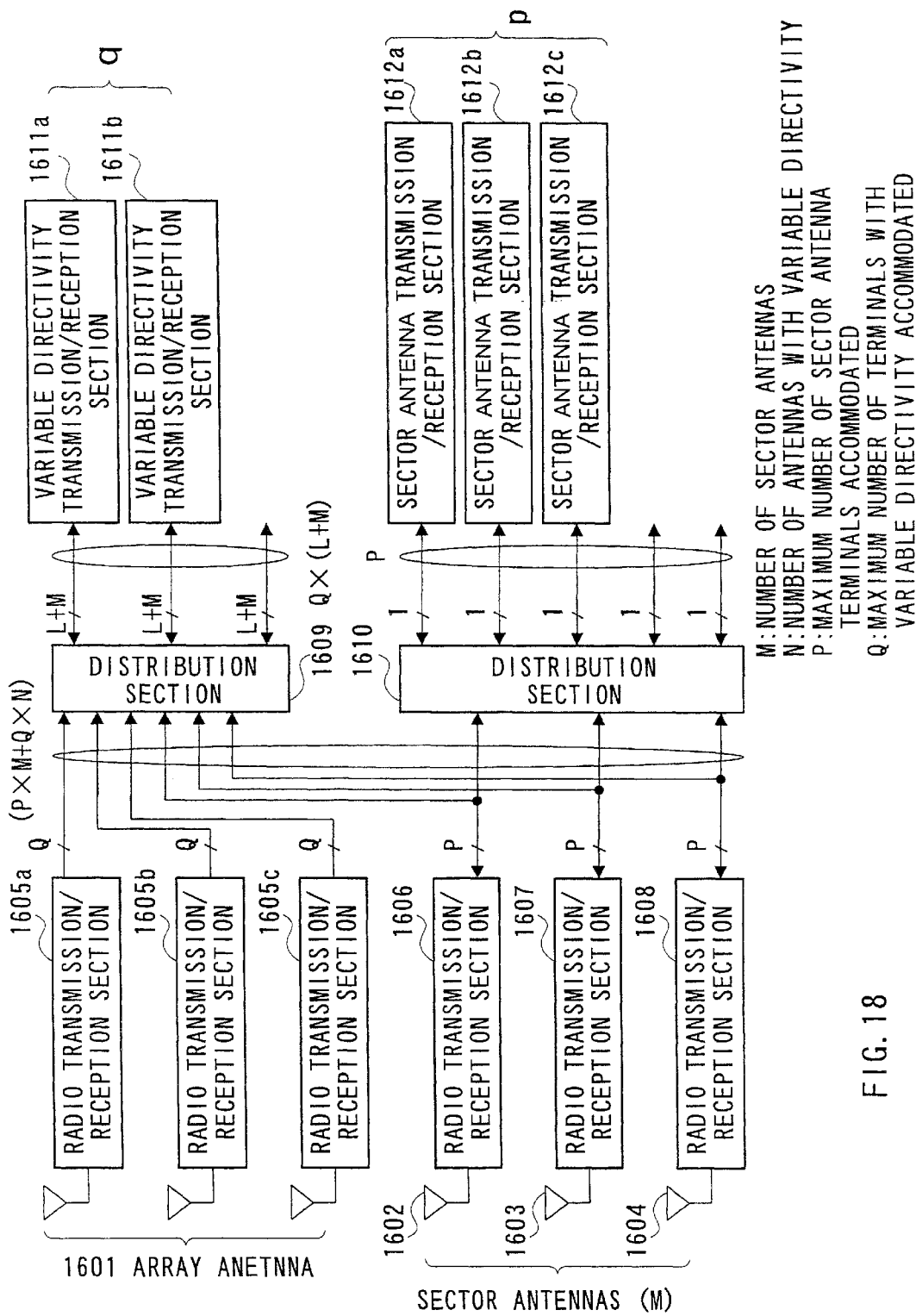
FIG. 18 is a block diagram showing a base station apparatus according to Embodiment 9 of the present invention.

FIG. 18 is a block diagram showing a configuration of the base station apparatus according to Embodiment 9 of the present invention. This embodiment explains a case where one array antenna for variable directivities made up of N antennas and M sector antennas are provided. Furthermore, this embodiment is provided with q variable directivity transmission/reception sections and p sector antenna transmission/reception sections. Then, suppose the maximum number of terminals accommodated by array antennas is P and the maximum number of terminals accommodated by sector antennas is Q.

In this base station apparatus, array antenna 1601 performs array antenna reception. Reception signals are subjected to amplification, frequency conversion and A/D conversion by radio transmission/reception sections 1605a to 1605c and sent to variable directivity reception sections 1611a and 1611b. At this time, array antenna radio transmission/reception sections 1605a to 1605c are each provided with a section that outputs baseband or IF (intermediate frequency) digital signals corresponding to the maximum number (Q) of variable directivity transmission/reception sections mounted and this output is output to distribution section 1609.

Distribution section 1609 is provided with an output section to a maximum of Q variable directivity transmission/reception sections 1611. The base station apparatus provides communication services by mounting a necessary number of variable directivity transmission/reception sections (building block system). Variable directivity reception sections 1611 perform reception and transmission according to one of the methods explained in Embodiments 1 to 8.

On the other hand, signals received by sector antennas 1602 to 1604 are subjected to amplification, frequency conversion and A/D conversion by radio transmission/reception sections 1606 to 1608, respectively and sent to distribution section 1610. At this time, radio transmission/reception sections 1606 to 1608 of sector antennas 1602 to 1604 are each provided with a section that outputs baseband or IF digital signals corresponding to the maximum number (P) of sector antenna transmission/reception sections 1612a to 1612c mounted and this output is output to distribution section 1610.

Distribution section 1610 is provided with an output section to a maximum of P sector antenna transmission/reception sections 1612. The base station apparatus provides communication services by mounting a necessary number of sector antenna transmission/reception sections 1612. Variable directivity reception sections 1612 perform reception and transmission according to one of the methods explained in Embodiments 1 to 8.

Embodiment 9 above measures the reception quality of a combined signal, performs transmit power control based on this result and controls assignment of sector antennas and array antenna, thus making it possible to minimize transmit power of each terminal and decrease interference, thereby increasing the subscriber capacity.

As described above, taking into account an optimal reception characteristic of a communication apparatus with variable directivity, the base station apparatus and radio communication method of the present invention have a communication apparatus with variable directivities positively accommodate communications with terminals with poor reception conditions, making it possible to reduce power of these terminals, reduce interference and increase the subscriber capacity in the system. Furthermore, the present invention can simplify control, make the system resistant to fading in a mobile communication environment and change the number of terminals accommodated with variable directivities.

This application is based on the Japanese Patent Application No.HEI 10-285642 filed on Oct. 7, 1998, entire content of which is expressly incorporated by reference herein.

INDUSTRIAL APPLICABILITY

The present invention is applicable to a base station apparatus in a digital radio communication system.

What is claimed is:

1. A base station apparatus comprising:
   at least one first communicator for carrying out a communication with fixed directivity;
   at least one second communicator for carrying out a communication with variable directivity;
   an assigner for assigning a communication to said first and second communicators according to a communication condition; and
   a communication condition detector for detecting said communication condition, wherein;
   said communication condition comprises interference with other terminals, and
   said assigner assigns a communication with small interference with other terminals to said first communicator and a communication with large interference with other terminals to said second communicator.

2. The base station apparatus according to claim 1, wherein said second communicator performs a narrower directivity in a communication having a greater interference with other terminals.

3. A base station apparatus comprising:
   at least one first communicator for carrying out a communication with fixed directivity;
   at least one second communicator for carrying out a communication with variable directivity;
   an assigner for assigning a communication to said first and second communicators according to a communication condition; and
   a communication condition detector for detecting said communication condition, wherein:
   said communication condition comprises a data rate of the reception signal, and said communication condition detector comprises a rate identifier for measuring said data rate of the reception signal.

4. The base station apparatus according to claim 3, wherein said assigner assigns a communication at a relatively low data rate to said first communicator and a communication at a relatively high data rate said second communicator.

5. The base station apparatus according to claim 3, wherein, when a number of terminals carrying out communications at a relatively high data rate is greater than a number of said second communicators, said assigner preferentially assigns a communication with terminals located far away from said base station among said terminals to said second communicator.

6. The base station apparatus according to claim 5, wherein said communication condition detector comprises a quality measurer for measuring the quality of the reception signal; and the base station further comprises a determiner for determining said far terminals based on the measurement result from said quality measurer.

7. The base station apparatus according to claim 3, wherein, when the number of terminals carrying out communications at a relatively high data rate is greater than a number of said second communicators, said assigner preferentially assigns a communication with terminals carrying out communications at higher data rate among said terminals to said second communicator.

8. A base station apparatus comprising:
   at least one first communicator for carrying out a communication with fixed directivity;
   at least one second communicator for carrying out a communication with variable directivity;
   an assigner for assigning a communication to said first and second communicators according to a communication condition; and
   a communication condition detector for detecting said communication condition, wherein:
     said communication condition comprises the quality of the reception signal, and
     said communication condition detector comprises a quality measurer for measuring the quality of the reception signal.

9. The base station apparatus according to claim 8, wherein said assigner assigns a communication with relatively poor quality of the reception signal to said second communicator.

10. A communication terminal apparatus carrying out a radio communication with a base station apparatus, said base station apparatus comprising:
    at least one first communicator for carrying out a communication with fixed directivity;
    at least one second communicator for carrying out a communication with variable directivity;
    an assigner for assigning communications to said first and second communicators according to a communication condition; and
    a communication condition detector for detecting said communication condition, wherein:
      said communication condition comprises interference with other terminals, and
      said assigner assigns a communication with small interference with other terminals to said first communicator and a communication with large interference with other terminals to said second communicator.

11. A radio communication method comprising the steps of:
    (a) measuring a data rate of a reception signal from a terminal;
    (b) deciding whether a communication with said terminal is carried out with a fixed directivity or a variable directivity, based on the measured data rate; and
    (c) carrying out said communication with said terminal with said fixed directivity or said variable directivity based on a decision result of step (b).

12. The radio communication method according to claim 11, wherein communication at a relatively low data rate is carried out with said fixed directivity and communication at a relatively high data rate is carried out with said variable directivity.

* * * * *